(12) United States Patent
Chung et al.

(10) Patent No.: US 10,038,290 B2
(45) Date of Patent: Jul. 31, 2018

(54) ELECTRICAL DEVICE

(71) Applicant: SAMSUNG ELECTRONICS CO., LTD., Suwon-si, Gyeonggi-do (KR)

(72) Inventors: Cheol-Yoon Chung, Suwon-si (KR); Dong-Sub Kim, Suwon-si (KR); Kwang-Min Gil, Yongin-si (KR); Yu-Ji Yu, Suwon-si (KR); Byoung-Hee Lee, Suwon-si (KR); Cheol-Ho Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/664,160

(22) Filed: Jul. 31, 2017

(65) Prior Publication Data
US 2018/0034224 A1    Feb. 1, 2018

(30) Foreign Application Priority Data

Jul. 29, 2016  (KR) .................. 10-2016-0097430

(51) Int. Cl.
*H01R 31/06* (2006.01)
*H01R 13/66* (2006.01)
(Continued)

(52) U.S. Cl.
CPC ......... *H01R 31/065* (2013.01); *G06F 13/385* (2013.01); *H01R 13/665* (2013.01); *H01R 2107/00* (2013.01)

(58) Field of Classification Search
CPC ............... H01R 13/719; H01R 13/665; H01R 13/6625; H01R 13/6473; H01R 13/6658;
(Continued)

(56) References Cited

U.S. PATENT DOCUMENTS 5,599,208 A * 2/1997 Ward .................. H01R 13/719
                                                                333/185
5,865,648 A * 2/1999 Clyatt, III ............ H01R 13/665
                                                                439/289

(Continued)

*Primary Examiner* — Truc Nguyen
(74) *Attorney, Agent, or Firm* — Nixon & Vanderhye, P.C.

(57) ABSTRACT

Various examples of a connector device for connecting an electronic device with an external electronic device are described. An electronic device may comprise a first universal serial bus (USB)-type first plug including a first terminal, a second terminal, a third terminal, a fourth terminal, and a fifth terminal, a second USB-type second receptacle including a sixth terminal, a seventh terminal, an eighth terminal, a ninth terminal, and a tenth terminal, a first conducting line electrically connecting the first terminal and the sixth terminal, a second conducting line electrically connecting the second terminal and the sixth terminal, a third conducting line electrically connecting the third terminal and the eighth terminal, a fourth conducting line electrically connecting the fourth terminal and the ninth terminal, a fifth conducting line electrically connecting the fifth terminal and the tenth terminal, a first resistor connected to the second conducting line, and a second resistor connected between the second terminal and the seventh terminal to enable a first electronic device connected to the first plug to recognize a second electronic device connected to the second receptacle.

16 Claims, 16 Drawing Sheets

(51) Int. Cl.
*G06F 13/38* (2006.01)
*H01R 107/00* (2006.01)

(58) Field of Classification Search
CPC ............... H01R 2103/00; H01R 12/57; H01R 13/6464; H01R 13/6608; H01R 13/6616; H01R 24/44; H01R 13/6633; H01R 24/64; H01R 25/003
See application file for complete search history.

(56) References Cited

U.S. PATENT DOCUMENTS

| | | | |
|---|---|---|---|
| 6,744,874 B2 | 6/2004 | Wu | |
| 7,352,601 B1 * | 4/2008 | Minneman | H05K 1/0284 |
| | | | 365/185.05 |
| 7,670,147 B1 * | 3/2010 | Lee | H01R 13/6625 |
| | | | 439/620.09 |
| 2005/0112920 A1 * | 5/2005 | Venaleck | H01R 9/032 |
| | | | 439/92 |
| 2006/0276064 A1 * | 12/2006 | Takimura | H01R 13/6585 |
| | | | 439/108 |
| 2012/0021618 A1 * | 1/2012 | Schultz | H01R 13/719 |
| | | | 439/38 |

* cited by examiner

| USB Type-C PLUG | | USB Micro-B RECEPTACLE | |
|---|---|---|---|
| Pin | Signal Name | Pin | Signal Name |
| A1,B1,A12,B12 | GND | 5 | GND |
| A4,B4,A9,B9 | $V_{BUS}$ | 1 | $V_{BUS}$ |
| A5 | CC | See Note 1 | |
| A6 | Dp1 | 3 | D+ |
| A7 | Dn1 | 2 | D- |
| | | 4 | ID |

FIG.6

| USB Type-C PLUG | USB Micro-B RECEPTACLE | WHETHER CONNECTION IS RECOGNIZED |
|---|---|---|
| ELECTRONIC DEVICE | CONNECTION WITH HOST DEVICE | RECOGNIZED |
| | CONNECTION WITH OTG DEVICE | NOT RECOGNIZED |

| USB Type-C PLUG | | Adaptor | USB Micro-B RECEPTACLE | |
|---|---|---|---|---|
| Pin | Signal Name | | Pin | Signal Name |
| A1,B1,A12,B12 | GND | connect | 5 | GND |
| A4,B4,A9,B9 | VBUS | connect | 1 | VBUS |
| A6 | Dp1 | connect | 3 | D+ |
| A7 | Dn1 | connect | 2 | D- |
| A5 | CC | Series 5.1kohm | 4 | ID |
| Shell | Shield | connect | Shell | Shield |

FIG.12

| USB Type-C PLUG | USB Micro-B RECEPTACLE | WHETHER CONNECTION IS RECOGNIZED |
|---|---|---|
| ELECTRONIC DEVICE | CONNECTION WITH HOST DEVICE | RECOGNIZED |
| | CONNECTION WITH OTG DEVICE | NOT RECOGNIZED |

FIG.13

ELECTRICAL DEVICE

CROSS-REFERENCE TO RELATED APPLICATION

This application is based on and claims the priority under 35 U.S.C. § 119 to a Korean patent application filed in the Korean Intellectual Property Office on Jul. 29, 2016 and assigned Serial No. 10-2016-0097430, the disclosure of which is incorporated by reference herein in its entirety.

TECHNICAL FIELD

The present disclosure relates generally to electronic devices.

BACKGROUND

Various electronic devices, such as cellular phones, MP3 players, portable media players (PMPs), tablet PCs, the Galaxy tab, smartphones, the iPad, and e-book devices, have recently been being introduced to users. Users may access various contents while carrying various electronic devices.

Such electronic devices may connect to various external electronic devices via connector devices and are in the tendency of being capable of providing expanded functionality through connections with external electronic devices.

For example, an electronic device may be connected with a host device, such as a computer or charger, via a connector device to receive power from the host device or communicate data while receiving power from the host device. Also, an electronic device may be connected with an on-the-go (OTG) device, such as a memory or electric fan, via a connector device to provide power to the OTG device or communicate data while providing power to the OTG device.

Specifically, the electronic device may include a universal serial bus (USB) receptacle for connection with an external electronic device, and the connector device may include a USB plug for connection to the USB receptacle. For example, the electronic device may include a USB micro B receptacle, and the connector device may include a USB micro B plug that may connect to the USB micro B receptacle.

Thus, a user of an electronic device with a USB micro B receptacle may connect the electronic device with various external electronic devices through the USB micro B plug.

The above information is presented as background information only to assist with an understanding of the present disclosure.

USB type C plugs have recently been developed and more often adopted for electronic devices. Therefore, a user of an electronic device with a USB type C receptacle, although it has a USB micro B connector device, may be required to have a separate connector device with a USB type C plug.

Adapters including USB type C plugs and micro B receptacles that are more compact have been developed for users who own legacy USB micro B connector devices. Such adapters may provide connections between USB C receptacle-equipped electronic devices and legacy USB micro B connector devices. USB type C receptacle-equipped electronic devices may connect to external electronic devices via USB micro B connector devices. Accordingly, users who have USB micro B connector devices oftentimes purchase and use adapters that are more compact and cheap instead of USB type C connector devices.

However, conventional adapters that include USB type C plugs and USB micro B receptacles have been designed to be able to recognize connections with host devices, such as computers or chargers, from which electronic devices can receive power, but not connections with OTG devices, such as memories or electric fans, from which electronic devices cannot receive power.

SUMMARY

According to an example embodiment of the present disclosure, a connector electronic device that enables an electronic device to recognize not only connection with a host device but also connection with an OTG device is provided.

According to an example embodiment of the present disclosure, a connector electronic device that enables an electronic device to prevent and/or reduce noise signals generated by data communication with an OTG device from affecting a communication unit of the electronic device when the electronic device connects to the OTG device and to prevent and/or reduce noise signals generated by the communication unit of the electronic device from affecting data communication between the electronic device and the OTG device is provided.

According to an example embodiment of the present disclosure, An electronic device may comprise a first universal serial bus (USB)-type first plug including a first terminal, a second terminal, a third terminal, a fourth terminal, and a fifth terminal, a second USB-type second receptacle including a sixth terminal, a seventh terminal, an eighth terminal, a ninth terminal, and a tenth terminal, a first conducting line electrically connecting the first terminal and the sixth terminal, a second conducting line electrically connecting the second terminal and the sixth terminal, a third conducting line electrically connecting the third terminal and the eighth terminal, a fourth conducting line electrically connecting the fourth terminal and the ninth terminal, a fifth conducting line electrically connecting the fifth terminal and the tenth terminal, a first resistor connected to the second conducting line, and a second resistor connected between the second terminal and the seventh terminal to enable a first electronic device connected to the first plug to recognize a second electronic device connected to the second receptacle.

According to an example embodiment of the present disclosure, an electronic device may comprise a housing, a first USB-type first plug positioned at a first end of the housing and including a first terminal, a second terminal, a third terminal, a fourth terminal, and a fifth terminal, a second USB-type second receptacle positioned at a second end of the housing, which faces the first end, and including a sixth terminal, a seventh terminal, an eighth terminal, a ninth terminal, and a tenth terminal, a first conducting line electrically connecting the first terminal and the sixth terminal, a second conducting line electrically connecting the second terminal and the sixth terminal, a third conducting line electrically connecting the third terminal and the eighth terminal, a fourth conducting line electrically connecting the fourth terminal and the ninth terminal, a fifth conducting line electrically connecting the fifth terminal and the tenth terminal, a first resistor connected to the second conducting line, and a second resistor connected between the second terminal and the seventh terminal to enable a first electronic device connected to the first plug to recognize a second electronic device connected to the second receptacle.

According to the various example embodiments of the present disclosure, when an electronic device and an external electronic device are connected together, an adapter having a USB type C plug and a USB micro B receptacle enables the electronic device to recognize a connection with an OTG device, such as a memory or electric fan, as well as a connection with a host device, such as a PC or charger.

According to an example embodiment of the present disclosure, an adapter having a USB type C plug and a USB micro B receptacle may prevent and/or reduce noise signals generated by data communication between an electronic device and an external electronic device from affecting the communication of the electronic device when the electronic device connects to the external electronic device and prevent and/or reduce noise signals generated by the communication unit of the electronic device from affecting data communication between the electronic device and the external electronic device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and attendant advantages of the present disclosure will be readily understood and appreciated from the following detailed description, taken in conjunction with the accompanying drawings, in which like reference numerals refer to like elements, and wherein:

FIG. 6 is a diagram illustrating example specifications of an adapter according to a first example embodiment of the present disclosure;

FIG. 12 is a diagram illustrating example specifications of an adapter according to the second example embodiment of the present disclosure;

FIG. 13 is a table illustrating an example operation of recognizing a connection with an external electronic device by an electronic device upon using an adapter according to the second example embodiment of the present disclosure;

Throughout the drawings, like reference numerals will be understood to refer to like parts, components, and structures.

DETAILED DESCRIPTION

Figure 1:
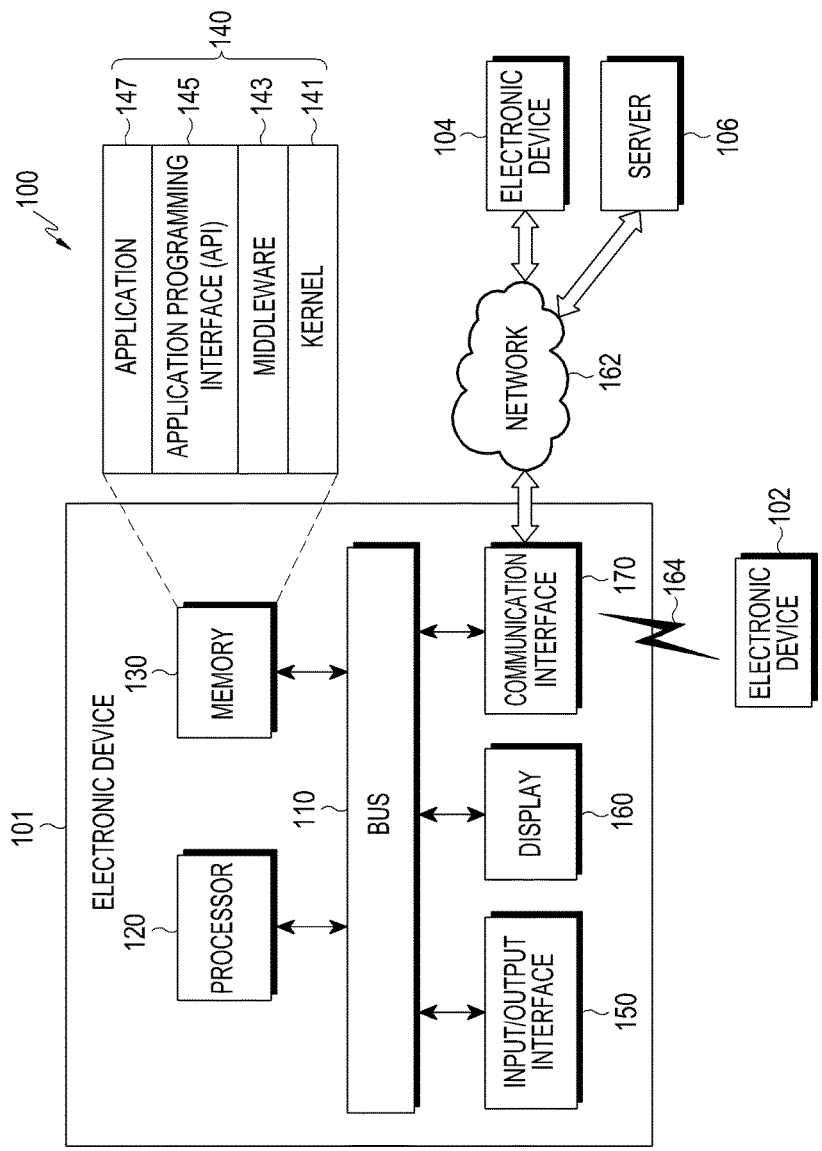
FIG. 1 is a block diagram illustrating a network environment including an example electronic device according to an example embodiment of the present disclosure.

Hereinafter, various example embodiments of the present disclosure are described with reference to the accompanying drawings. However, it should be appreciated that the present disclosure is not limited to the example embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be used interchangeably with other terms, such as "suitable for," "capable of," "modified to," "made to," "adapted to," "able to," or "designed to" in hardware or software in the context. Rather, the term "configured to" may refer to a situation in which a device can perform an operation together with another device or parts. For example, the term "processor configured (or set) to perform A, B, and C" may refer, for example, to a generic-purpose processor (e.g., a CPU or application processor) that may perform the operations by executing one or more software programs stored in a memory device or a dedicated processor (e.g., an embedded processor) for performing the operations.

For example, the electronic device according to various example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device, or the like, but is not limited thereto. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device, or the like, but is not limited thereto. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto. According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but is not limited thereto.

According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an example embodiment of the present disclosure, an electronic device 101 may be included in a network environment 100. The electronic device 101 may include a bus 110, a processor (e.g., including processing circuitry) 120, a memory 130, an input/output interface (e.g., including input/output interface circuitry) 150, a display 160, and a communication interface (e.g., including communication circuitry) 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may include various processing circuitry, such as, for example, and without limitation, one or more of a dedicated processor, a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests.

The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

The communication interface 170 may include various communication circuitry and set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device. Additionally, the communication interface 170 may establish a short-range wireless communication connection with an external electronic device (e.g., first electronic device 102).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
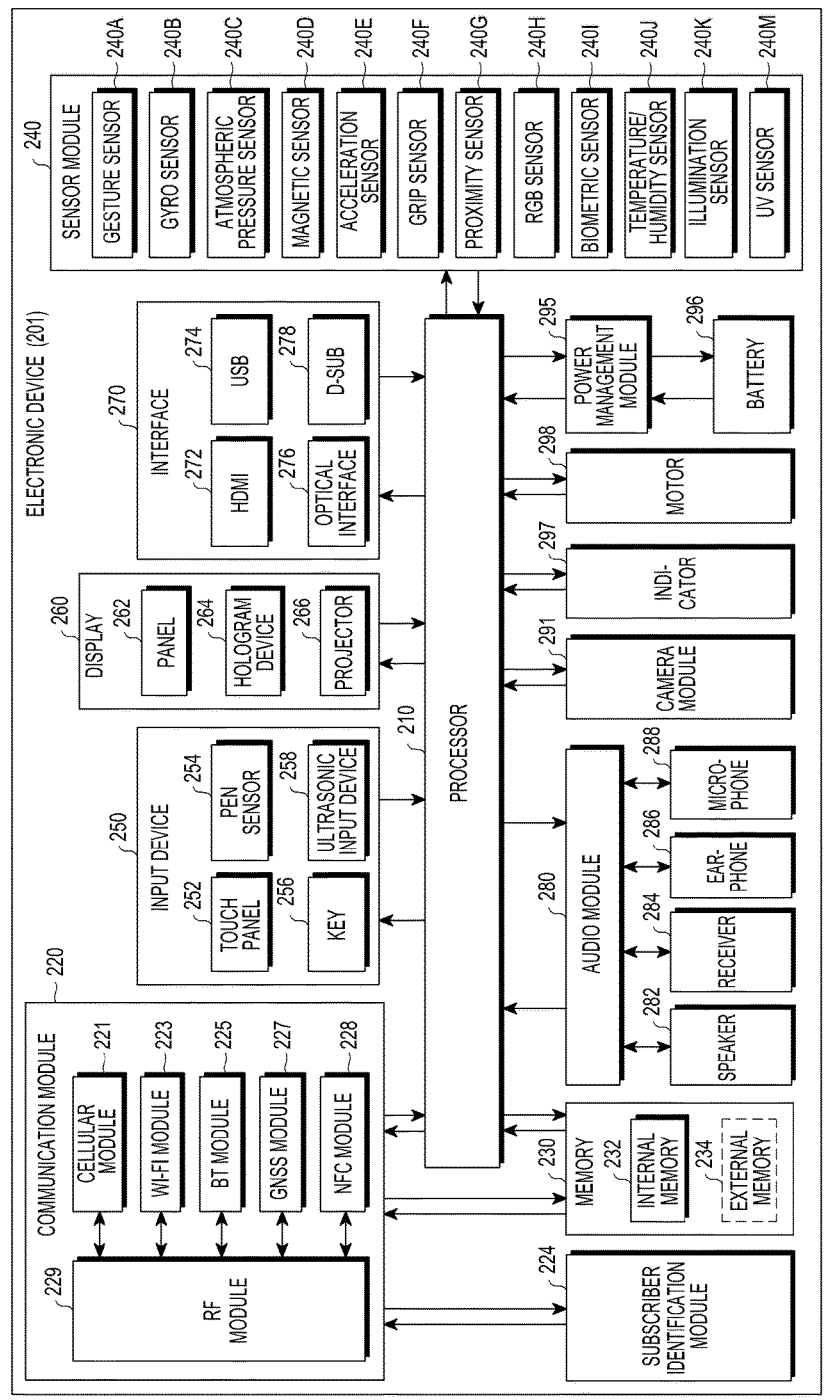
FIG. 2 is a block diagram illustrating an example electronic device according to an example embodiment of the present disclosure.

FIG. 2 is a block diagram illustrating an example electronic device according to an example embodiment of the present disclosure.

The electronic device 201 may include the whole or part of the configuration of, e.g., the electronic device 101 illustrated in FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include various communication circuitry, such as, for example, and without limitation, a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

The sensor module 240 may, for example, measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include various input circuitry, such as, for example, and without limitation, a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include various interface circuitry, such as, for example, and without limitation, a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may be used for converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
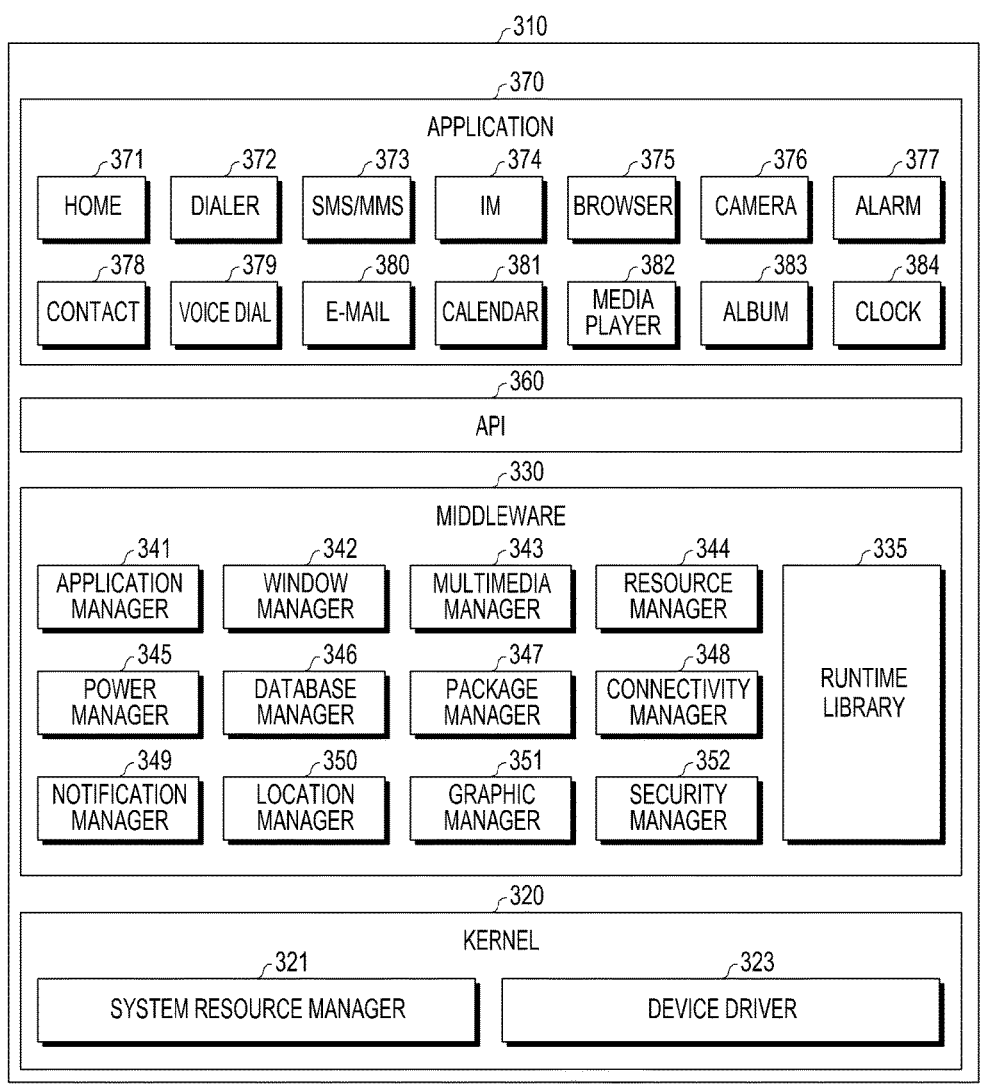
FIG. 3 is a block diagram illustrating an example program module according to an example embodiment of the present disclosure.

FIG. 3 is a block diagram illustrating an example program module according to an example embodiment of the present disclosure;

According to an embodiment of the present disclosure, the program module 310 (e.g., the program 140) may include an operating system (OS) controlling resources related to the electronic device (e.g., the electronic device 101) and/or various applications (e.g., the application processor 217) driven on the operating system. The operating system may include, e.g., Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components.

The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384. Additionally or alternatively, although not shown, the application 370 may include a heath-care (e.g., measuring the degree of workout or bloodsugar), or provision of environmental information (e.g., provision of air pressure, moisture, or temperature information).

According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a healthcare application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

According to an embodiment of the present disclosure, the electronic device may connect to various external electronic devices via connector devices and may provide expanded functionality through connections with external electronic devices. For example, the electronic device may be connected with an external host device, such as a computer or charger, via a connector device, such as a plug or receptacle, to receive power from the external host device or communicate data while receiving power from the external host device. Also, the electronic device may be connected with an external on-the-go (OTG) device, such as a memory or electric fan, via a connector device to provide power to the external OTG device or communicate data while providing power to the external OTG device.

According to an example embodiment of the present disclosure, the connector device may be an electronic device.

According to an example embodiment of the present disclosure, the electronic device may include a first USB-type first plug that includes a first terminal, a second terminal, a third terminal, a fourth terminal, and a fifth terminal, a second USB-type receptacle that includes a sixth terminal, a seventh terminal, an eighth terminal, a ninth terminal, and a tenth terminal, a first conducting line that electrically connects the first terminal and the sixth terminal, a second conducting line that electrically connects the second terminal and the sixth terminal, a third conducting line that electrically connects the third terminal and the eighth terminal, a fourth conducting line that electrically connects the fourth terminal and the ninth terminal, a fifth conducting line that electrically connects the fifth terminal and the tenth terminal, a first resistor connected to the second conducting line, and a second resistor connected between the second terminal and the seventh terminal so that a second electronic device connected to the second receptacle by a first electronic device connected to the first plug may be identified.

According to an example embodiment of the present disclosure, a filter may be connected to the fourth conducting line and the fifth conducting line.

According to an example embodiment of the present disclosure, the first USB type may be USB type C, and the second USB type may be a USB micro B type.

According to an example embodiment of the present disclosure, the first terminal, the second terminal, the third terminal, the fourth terminal, and the fifth terminal, respectively, may include a VBUS terminal, a CC terminal, a GND terminal, a Dp1 terminal, and a Dn1 terminal, and the sixth terminal, the seventh terminal, the eighth terminal, the ninth terminal, and the tenth terminal, respectively, may include a VBUS terminal, an ID terminal, a GND terminal, a D+ terminal, and a D− terminal.

According to an example embodiment of the present disclosure, the first resistor may be 56 kohm, and the second resistor may be 5.1 kohm.

According to an example embodiment of the present disclosure, the electronic device may include a housing, a first USB-type first plug that is positioned at a first end of the housing and includes a first terminal, a second terminal, a third terminal, a fourth terminal, and a fifth terminal, a second USB-type receptacle that is positioned at a second end of the housing, which faces the first end, and includes a sixth terminal, a seventh terminal, an eighth terminal, a ninth terminal, and a tenth terminal, a first conducting line that electrically connects the first terminal and the sixth terminal, a second conducting line that electrically connects the second terminal and the sixth terminal, a third conducting line that electrically connects the third terminal and the eighth terminal, a fourth conducting line that electrically connects the fourth terminal and the ninth terminal, a fifth conducting line that electrically connects the fifth terminal and the tenth terminal, a first resistor connected to the second conducting line, and a second resistor connected between the second terminal and the seventh terminal so that a second electronic device connected to the second receptacle by a first electronic device connected to the first plug may be identified.

Figure 4:
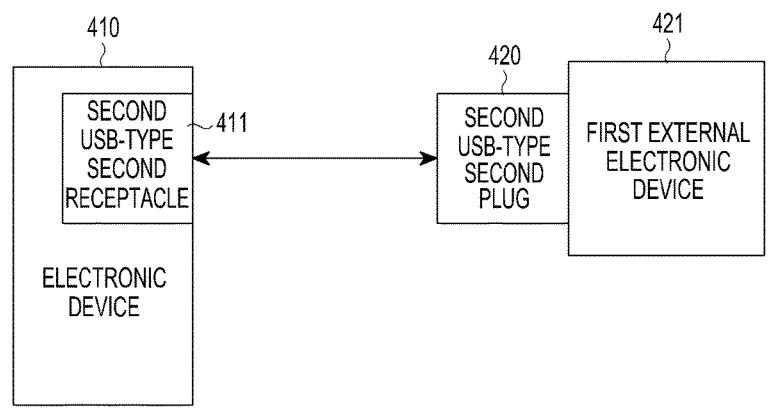
FIG. 4 is a diagram illustrating an example of a first connection between an electronic device and an external electronic device according to an example embodiment of the present disclosure.

FIG. 4 is a diagram illustrating an example of a first connection between an electronic device and an external electronic device according to an example embodiment of the present disclosure.

Referring to FIG. 4, when an electronic device 410 includes a second USB-type second receptacle 411, the electronic device 410 may be connected with an external electronic device 421 through a second USB-type second plug 420. As a specific example, when the electronic device has a USB micro B receptacle, the electronic device may be connected with each of OTG devices having USB micro B plugs or may be connected with a personal computer (PC) or charger through a cable with a USB micro B plug.

Figure 5:
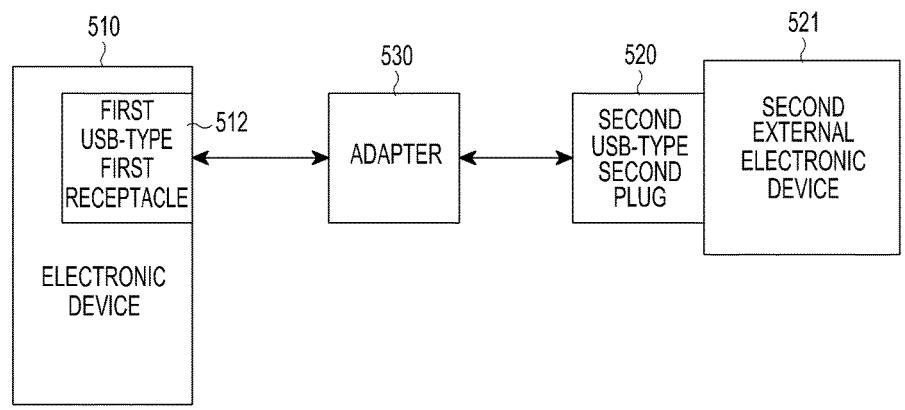
FIG. 5 is a diagram illustrating an example of a second connection between an electronic device and an external electronic device according to an example embodiment of the present disclosure.

FIG. 5 is a diagram illustrating an example of a second connection between an electronic device and an external electronic device according to an example embodiment of the present disclosure.

Referring to FIG. 5, when an electronic device 510 includes a first USB-type first receptacle 512, the electronic device 510 may be connected with an external electronic device 521 through a second USB-type second plug 520. Accordingly, where the electronic device 510 has a first USB-type first receptacle 512, and the external electronic device 521 has a second USB-type second plug 520, the electronic device 510 and the external electronic device 521 may be connected together by making a connection between the first USB-type first receptacle 512 and the second USB-type second plug 520 using an adapter (also called a gender) 530. According to an example embodiment of the present disclosure, where the electronic device 510 has a USB type C receptacle, and the external electronic device 521 has a USB micro B plug, a connection may be made between the USB type C receptacle and the USB micro B plug using an adapter.

FIG. 6 is a diagram illustrating example specifications of an adapter according to a first example embodiment of the present disclosure.

Referring to FIG. 6, the adapter may follow the specifications of USB type C plugs and the specifications of USB micro B receptacles. A USB type C plug may include a plurality of pins, some of which, respectively, may be used as VBUS, CC, Dp1, Dn1, and GND signal terminals. A USB micro B receptacle may include five pins that, respectively, may be used as VBUS, ID, D+, D−, and GND signal terminals.

Figure 7A:
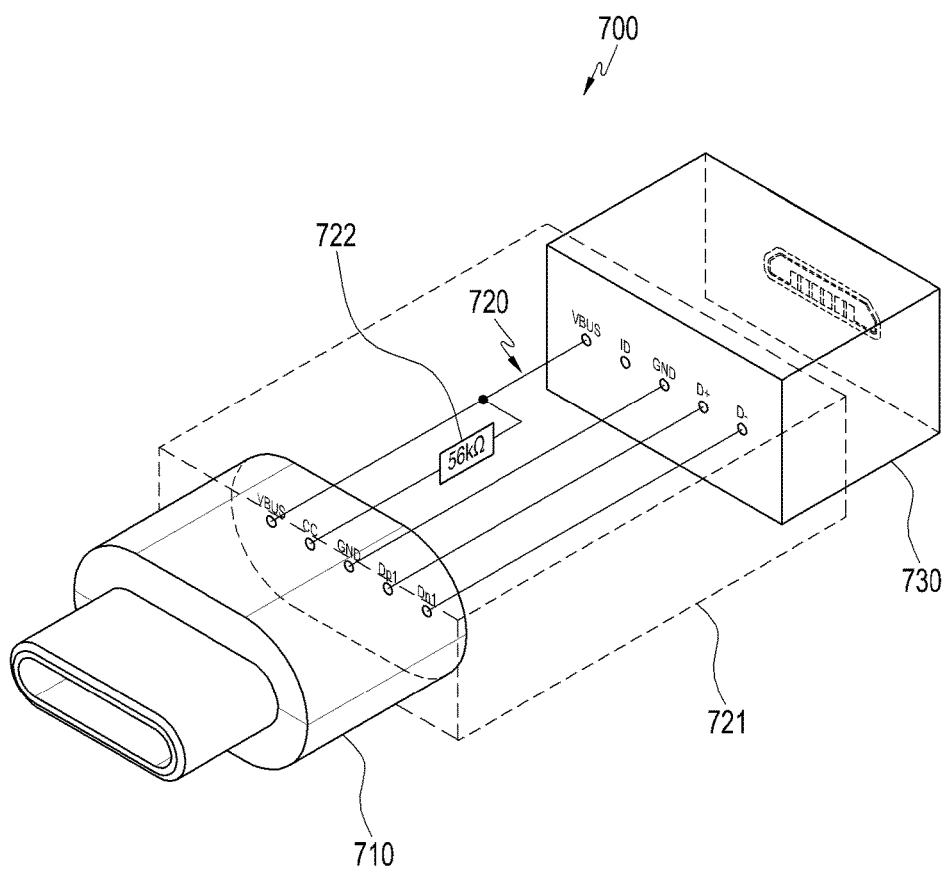
FIG. 7A is a diagram illustrating an example structure of an adapter according to the first example embodiment of the present disclosure.
Figures 7B, 8:
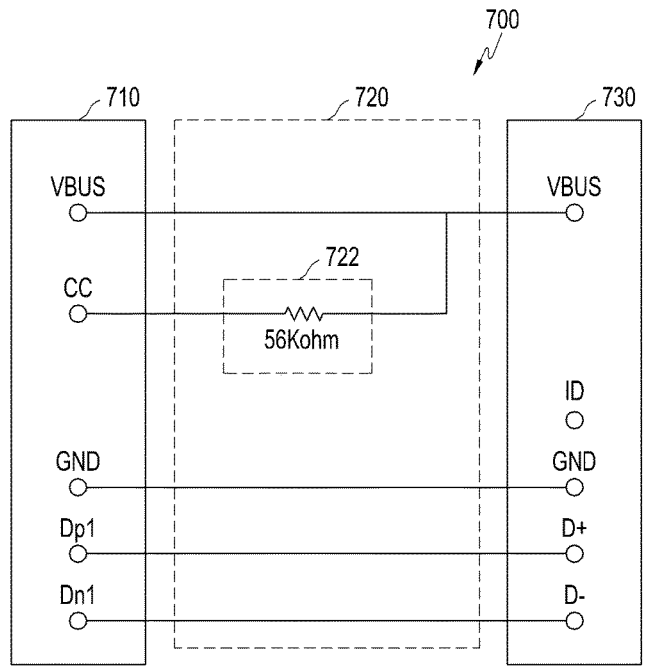
FIG. 7B is a diagram illustrating an example circuit configuration of an adapter according to the first example embodiment of the present disclosure.
FIG. 8 is a table illustrating an example operation of recognizing a connection with an external electronic device by an electronic device upon using an adapter according to the first example embodiment of the present disclosure.

FIG. 7A is a diagram illustrating an example structure of an adapter according to a first example embodiment of the present disclosure. FIG. 7B is a diagram illustrating an example circuit configuration of an adapter according to the first example embodiment of the present disclosure.

Referring to FIGS. 7A and 7B, an adapter 700 may include a first USB-type first plug 710, an electric circuit 720, and a second USB-type second receptacle 730. The adapter 700 may further include a housing 721 between the first USB-type first plug 710 and the second USB-type second receptacle 730 to connect the first USB-type first plug 710 and the second USB-type second receptacle 730. The first USB-type first plug 710 may be positioned at a first end of the housing 721, and the second USB-type second receptacle 730 may be positioned at a second end of the housing 721 that faces the first end. According to an example embodiment of the present disclosure, the first USB-type first plug 710 may be a USB type C plug and may include a VBUS terminal, a CC terminal, a Dp1 terminal, a Dn1 terminal, and a GND terminal According to an example embodiment of the present disclosure, the housing 721 may be a cable that connects the first USB-type first plug 710 and the second USB-type second receptacle 730.

The second USB-type second receptacle 730 may be a USB micro B receptacle and may include a VBUS terminal, an ID terminal, a D+ terminal, a D− terminal, and a GND terminal.

The electric circuit 720 may include a first conducting line that electrically connects the VBUS terminals, a second conducting line that electrically connects the CC terminal with the VBUS terminal of the second USB-type second receptacle 730, a third conducting line that electrically connects the Dp1 terminal and the D+ terminal, a fourth conducting line that electrically connects the Dn1 terminal and the D− terminal, and a fifth conducting line that electrically connects the GND terminals. The electric circuit 720 may include a first resistor 722 connected to the second conducting line. According to an example embodiment of the present disclosure, the first resistor 722 may have a resistance that enables a determination as to whether power is supplied from an electronic device connected to the first USB-type first plug 710 to the VBUS terminal of the second USB-type second receptacle 730. According to an embodiment of the present disclosure, the first resistor 722 may be, for example, and without limitation, 56 kohm.

FIG. 8 is a table illustrating an example operation of recognizing a connection with an external electronic device by an electronic device upon using an adapter according to the first example embodiment of the present disclosure.

Referring to FIG. 8, an electronic device, such as a smart phone or cellular phone, may be connected to a USB type C plug of an adapter, and a host device, such as a PC or charger, or an OTG device, such as a memory or electric fan, may be connected to a USB micro B receptacle.

Where a host device, such as a PC or charger, is connected to the USB micro B receptacle, the electronic device may recognize the connection of the host device by power supplied from the host device. However, where an OTG device, such as a memory or electric fan, is connected to the USB micro B receptacle, the electronic device cannot recognize the connection of the OTG device because no power is supplied from the OTG device.

Figure 9:
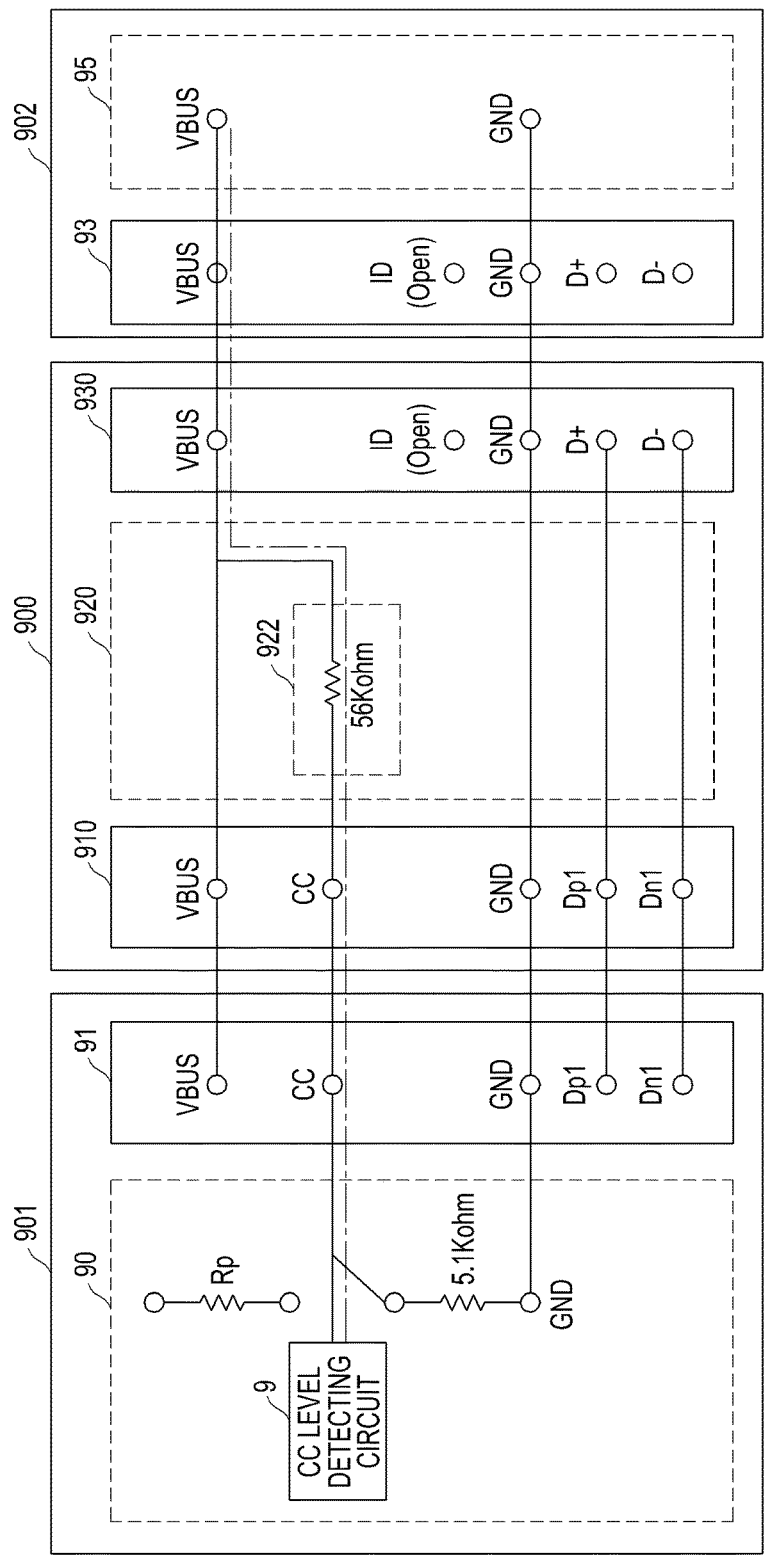
FIG. 9 is a diagram illustrating an example circuit when an electronic device and a host device are connected together via an adapter according to the first example embodiment of the present disclosure.

FIG. 9 is a diagram illustrating an example circuit when an electronic device and a host device are connected together via an adapter according to the first example embodiment of the present disclosure.

Referring to FIG. 9, a first electronic device 901 may be connected to a USB type C plug 910 of an adapter 900, and a second electronic device 902 may be connected to a USB micro B receptacle 930 of the adapter 900.

The second electronic device 902 may be a host device that is capable of supplying power. According to an example embodiment of the present disclosure, the second electronic device 902 may include a USB micro B plug 93 and a power supply 95. Where the USB micro B plug 93 of the second electronic device 902 is connected to the USB micro B receptacle 930 of the adapter 900, power may be applied from the power supply 95 to the VBUS terminal of the USB micro B receptacle 930. As power is applied to the VBUS terminal of the USB micro B receptacle 930, a current may flow into the CC terminal of the USB type C plug 910 through an electric circuit 920.

The first electronic device 901 may include a USB type C receptacle 91 and a CC level detector 90. Where the USB type C receptacle 91 of the first electronic device 901 is connected to the USB type C plug 910 of the adapter 900, the CC level detector 90 may detect a voltage level that is applied between the CC terminal and the GND terminal through a CC level detecting circuit 9. When the detected voltage level applied between the CC terminal and the GND terminal is within a predetermined voltage range, the first electronic device 901 may recognize that the second electronic device 902 is connected. For example, and without limitation, the predetermined voltage range may be from 0.25V to 0.61V.

According to an example embodiment of the present disclosure, where the second electronic device 902 is a host electronic device that supplies a 5V voltage, the voltage level applied between the CC terminal and the GND terminal may become 0.417V(=5V*(5.1 kohm/(56 kohm+5.1 kohm) by the first resistor 922, 56 kohm, which is connected to the electric circuit 920 of the adapter 900 and a resistance, 5.1 kohm, which is included in the CC level detector 90 of the first electronic device 901. When the voltage level applied between the CC terminal and the GND terminal is detected to be 0.417V, the voltage level falls within a predetermined voltage range, e.g., from 0.25V to 0.61V, and thus, the first electronic device 901 may recognize the connection with the second electronic device 902.

Figure 10:
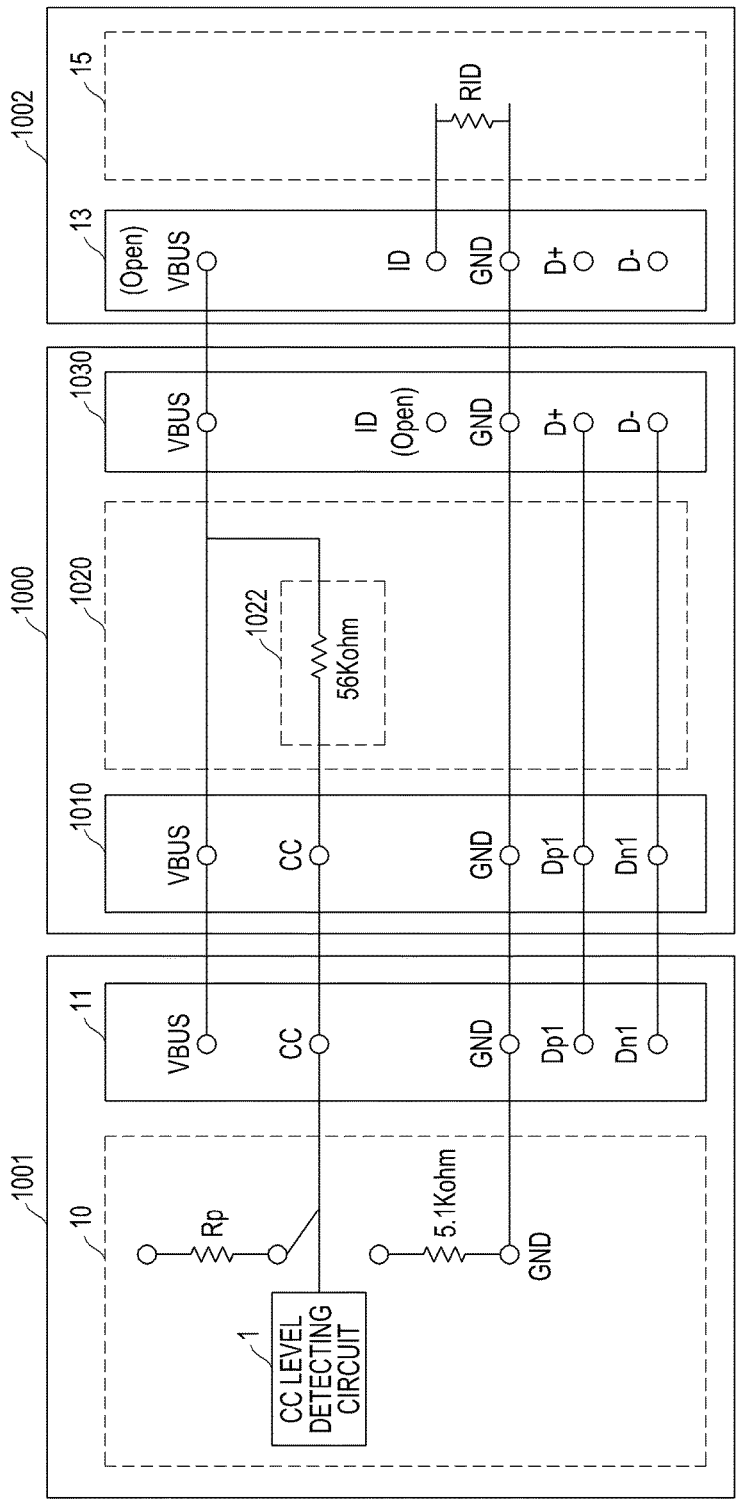
FIG. 10 is a diagram illustrating an example circuit when an electronic device and an OTG device are connected together via an adapter according to the first example embodiment of the present disclosure.

FIG. 10 is a diagram illustrating an example circuit when an electronic device and an OTG device are connected together via an adapter according to the first example embodiment of the present disclosure.

Referring to FIG. 10, a first electronic device 1001 may be connected to a USB type C plug 1010 of an adapter 1000, and a second electronic device 1002 may be connected to a USB micro B receptacle 1030 of the adapter 1000.

The second electronic device 1002 may be an OTG device that is unable to supply power. According to an example embodiment of the present disclosure, the second electronic device 1002 may include a USB micro B plug 13. Although the USB micro B plug 13 of the second electronic device 1002 is connected to the USB micro B receptacle 1030 of the adapter 1000, no power is applied to the VBUS terminal of the USB micro B receptacle 1030. Thus, the current cannot flow into the CC terminal of the USB type C plug 1010 through the electric circuit 1020. According to an example embodiment of the present disclosure, the current cannot flow into the CC terminal of the USB type C plug 1010 through a registor (56 Kohm) 1022.

The first electronic device 1001 may include a USB type C receptacle 11 and a CC level detector 10. Where the USB type C receptacle 11 of the first electronic device 1001 is connected to the USB type C plug 1010 of the adapter 1000, no current is provided from the CC terminal of the USB type C plug 1010. Therefore, the CC level detector 10 is turned into a pull-up state by resistor Rp, and the CC level detecting circuit 1 detects a voltage of 2.04V or more. Upon detecting a voltage of 2.04V or more by the CC level detecting circuit 1, the first electronic device 1001 may determine that there is no device connection and can not recognize the connection with the second electronic device 1002.

Thus, according to an example embodiment of the present disclosure, a need exists for an adapter that enables the electronic device to recognize not only connection with the host device but also connection with the OTG device.

Figure 11A:
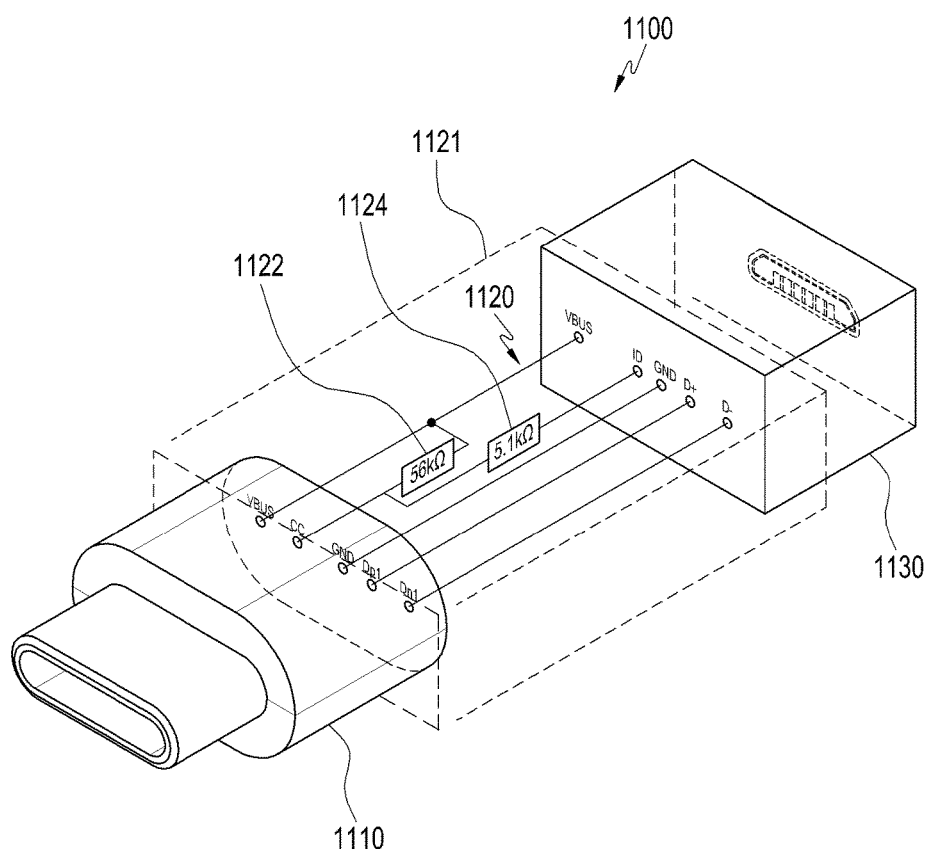
FIG. 11A is a diagram illustrating an example structure of an adapter according to a second example embodiment of the present disclosure.
Figure 11B:
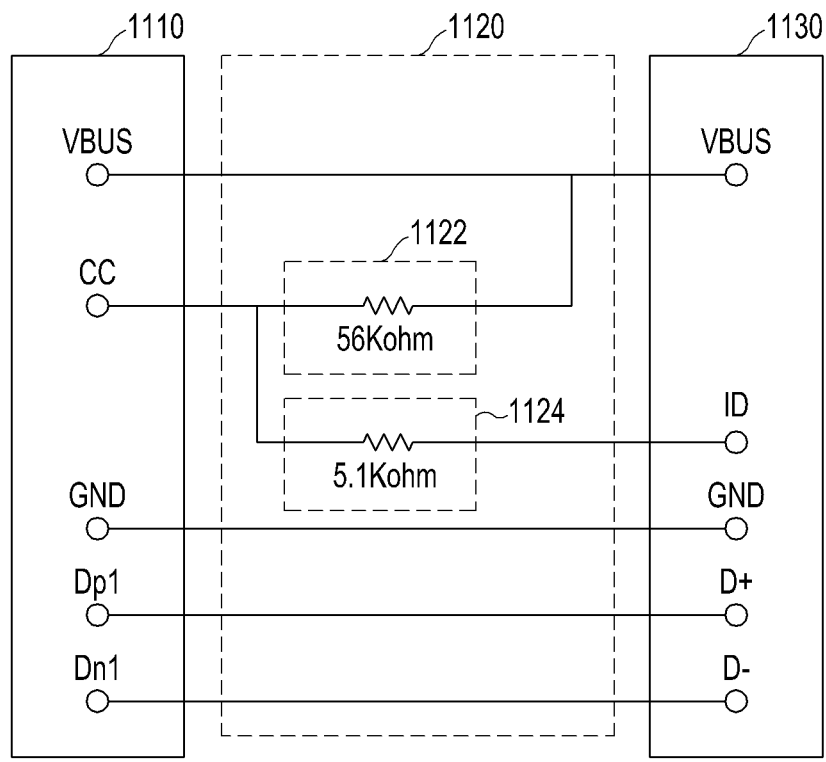
FIG. 11B is a diagram illustrating an example circuit configuration of an adapter according to the second example embodiment of the present disclosure.

FIG. 11A is a diagram illustrating an example structure of an adapter according to a second example embodiment of the present disclosure. FIG. 11B is a diagram illustrating an example circuit configuration of an adapter according to the second example embodiment of the present disclosure.

Referring to FIGS. 11A and 11B, an adapter 1100 may include a first USB-type first plug 1110, an electric circuit 1120, and a second USB-type second receptacle 1130. The adapter 1100 may further include a housing 1121 between the first USB-type first plug 1110 and the second USB-type second receptacle 1130 to connect the first USB-type first plug 1110 and the second USB-type second receptacle 1130. Where the adapter 1100 further includes the housing 1121, the first USB-type first plug 1110 may be positioned at a first end of the housing 1121, and the second USB-type second receptacle 1130 may be positioned at a second end of the housing 1121 that faces the first end. The first USB-type first plug 1110 may be a USB type C plug and may include a VBUS terminal, a CC terminal, a Dp1 terminal, a Dn1 terminal, and a GND terminal According to an example embodiment of the present disclosure, the housing 1121 may be a cable that connects the first USB-type first plug 1110 and the second USB-type second receptacle 1130.

The second USB-type second receptacle 1130 may be a USB micro B receptacle and may include a VBUS terminal, an ID terminal, a D+ terminal, a D− terminal, and a GND terminal.

The electric circuit 1120 may include a firt conducting line that electrically connects the VBUS terminals, second conducting line that electrically connects the Dp1 terminal and the D+ terminal, a third conducting line that electrically connects the Dn1 terminal and the D− terminal, a fourth conducting line that electrically connects the GND terminals, a first resistor 1122 connected between the CC terminal and the first conducting line, and a second resistor 1124 connected between the CC terminal and the ID terminal.

According to an example embodiment of the present disclosure, the first resistor 1122 may have a resistance that enables a determination as to whether power is supplied from an electronic device connected to the first USB-type first plug 1110 to the VBUS terminal of the second USB-type second receptacle 1130. According to an embodiment of the present disclosure, the first resistor 1122 may, for example, and without limitation, be 56 kohm.

According to an embodiment of the present disclosure, the second resistor 1124 may have a resistance that enables a determination as to whether an external device is connected to the ID terminal of the second USB-type second receptacle 1130 in an electronic device connected to the first USB-type first plug 1110. According to an embodiment of the present disclosure, the second resistor 1124 may, for example, and without limitation, be 5.1 kohm.

FIG. 12 is a diagram illustrating example specifications of an adapter according to the second example embodiment of the present disclosure.

Referring to FIG. 12, the adapter 1200 may follow the specifications of USB type C plugs and the specifications of USB micro B receptacles and may include a resistor that is connected in series between a CC pin of a plurality of pins included in a USB type C plug and an ID pin of a plurality of pins included in a USB micro B receptacle. The resistor may be 5.1 kohm.

FIG. 13 is a table illustrating an example operation of recognizing a connection with an external electronic device by an electronic device upon using an adapter according to the second example embodiment of the present disclosure.

Referring to FIG. 13, an electronic device, such as a smart phone or cellular phone, may be connected to a USB type C plug of an adapter, and a host device, such as a PC or charger, or an OTG device, such as a memory or electric fan, may be connected to a USB micro B receptacle.

Where a host device, such as a PC or charger, is connected to the USB micro B receptacle of the adapter, the electronic device may recognize the connection of the host device by power supplied from the host device. Where an OTG device, such as a memory or electric fan, is connected to the USB micro B receptacle of the adapter, the electronic device can recognize the connection of the OTG device through the resistor connected between the CC terminal and the ID terminal.

Figure 14:
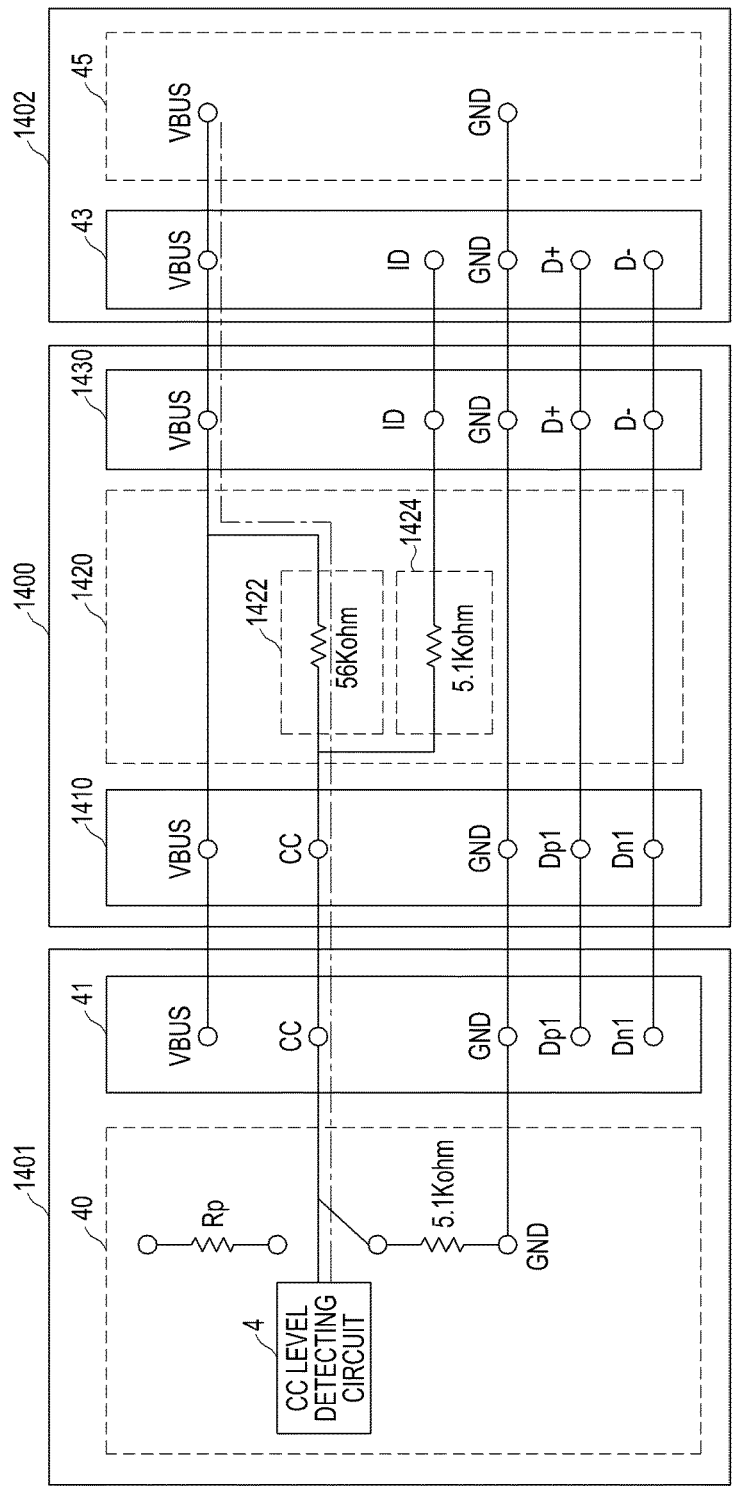
FIG. 14 is a diagram illustrating an example circuit when an electronic device and a host device are connected together via an adapter according to the second example embodiment of the present disclosure.

FIG. 14 is a diagram illustrating an example circuit when an electronic device and a host device are connected together via an adapter according to the second example embodiment of the present disclosure.

Referring to FIG. 14, a first electronic device 1401 may be connected to a USB type C plug 1410 of an adapter 1400, and a second electronic device 1402 may be connected to a USB micro B receptacle 1430 of the adapter 1400.

The second electronic device 1402 may be a host device that is capable of supplying power. According to an embodiment of the present disclosure, the second electronic device 1402 may include a USB micro B plug 43 and a power supply 45. Where the USB micro B plug 43 of the second electronic device 1402 is connected to the USB micro B receptacle 1430 of the adapter 1400, power may be applied from the power supply 45 to the VBUS terminal of the USB micro B receptacle 1430. As power is applied to the VBUS terminal of the USB micro B receptacle 1430, a current may flow into the CC terminal of the USB type C plug 1410 through an electric circuit 1420.

The first electronic device 1401 may include a USB type C receptacle 41 and a CC level detector 40. Where the USB type C receptacle 41 of the first electronic device 1401 is connected to the USB type C plug 1410 of the adapter 1400, the CC level detector 40 may detect a voltage level that is applied between the CC terminal and the GND terminal through a CC level detecting circuit 4. When the detected voltage level applied between the CC terminal and the GND terminal is within a predetermined voltage range, the first electronic device 1401 may recognize that the second electronic device 1402 is connected. The predetermined voltage level may follow the USB type C standards.

According to an embodiment of the present disclosure, where the second electronic device 1402 is a host electronic device that supplies a 5V voltage, the voltage level applied between the CC terminal and the GND terminal may become 0.417V(=5V*(5.1 kohm/(56 kohm+5.1 kohm) by the first resistor 1422, 56 kohm, which is connected to the electric circuit 1420 of the adapter 1400 and a second resistor 1424, 5.1 kohm, which is included in the CC level detector 40 of the first electronic device 1401. When the voltage level applied between the CC terminal and the GND terminal is detected to be 0.417V, the voltage level falls within a predetermined voltage range, e.g., from 0.25V to 0.61V, and thus, the first electronic device 1401 may recognize the connection with the second electronic device 1402.

Figure 15:
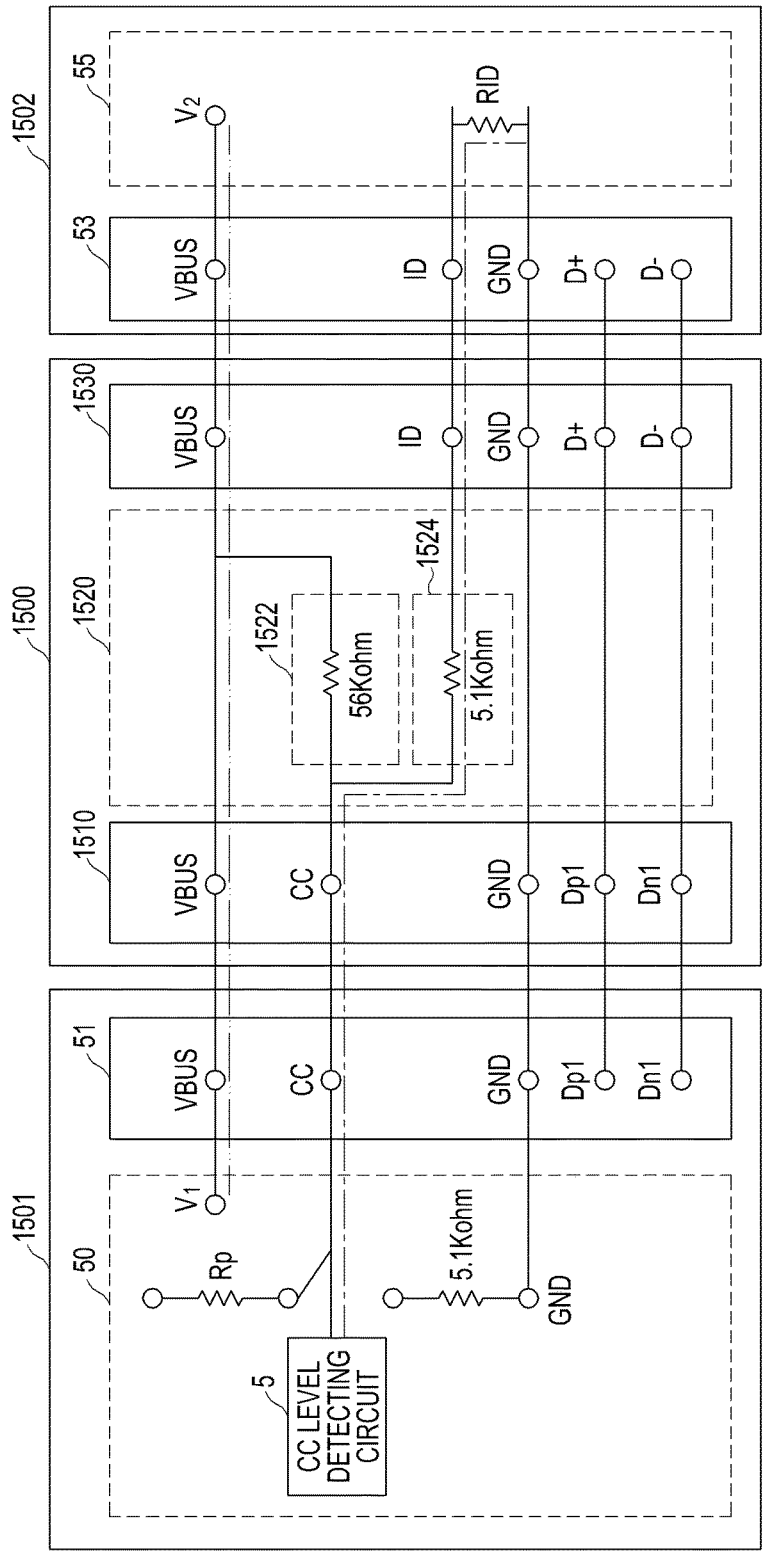
FIG. 15 is a diagram illustrating an example circuit when an electronic device and an OTG device are connected together via an adapter according to the second example embodiment of the present disclosure.

FIG. 15 is a diagram illustrating an example circuit when an electronic device and an OTG device are connected together via an adapter according to the second embodiment of the present disclosure.

Referring to FIG. 15, a first electronic device 1501 may be connected to a USB type C plug 1510 of an adapter 1500, and a second electronic device 1502 may be connected to a USB micro B receptacle 1530 of the adapter 1500.

The second electronic device 1502 may be an OTG device that is unable to supply power. According to an embodiment of the present disclosure, the second electronic device 1502 may include a USB micro B plug 53. Although the USB micro B plug 53 of the second electronic device 1502 is connected to the USB micro B receptacle 1530 of the adapter 1500, no power is applied to the VBUS terminal of the USB micro B receptacle 1530. Thus, the current does not flow into the CC terminal of the USB type C plug 1510 through the electric circuit 1520. Instead, the current from the first electronic device 1501 flows from the CC terminal to the ID terminal because the second resistor 1524 is connected between the CC terminal and the USB micro B receptacle 1530.

The first electronic device 1501 may include a USB type C receptacle 51 and a CC level detector 50 and may detect a voltage level applied to the CC terminal through the CC level detecting circuit 5. According to an embodiment of the present disclosure, where a current flows from the first electronic device 1501 through the CC terminal to the ID terminal, the CC level detector 50 may detect a voltage of 0.417V (=5V*(5.1 kohm/(56 kohm+5.1 kohm)) based on a first resistor 1522 and the second register 1524 and voltage supplied by the first electronic device 1501. Where the voltage level detected at the CC terminal is 0.417V, the voltage level falls within the predetermined voltage range from 0.2V to 1.6V, so that the first electronic device 1501 may recognize the connection with the second electronic device 1502.

When the first electronic device 1501 recognizes the connection with the second electronic device 1502, power may be provided from the first electronic device 1501 through the adapter 1500 to the second electronic device 1502. Since, although power is provided from the first electronic device 1501 to the second electronic device 1502, the voltage applied to the CC terminal is 0.77V(=5V*(5.1 kohm/(28 kohm+5.1 kohm)), which falls within the predetermined voltage range from 0.2V to 1.6V, the recognition of the connection with the second electronic device 1502 might not be influenced.

Accordingly, the use of the adapter according to the second embodiment enables an electronic device having a USB type C receptacle to recognize a connection with an OTG device as well as a connection with a host device when it is connected with an external electronic device having a USB micro B plug.

Figure 16A:
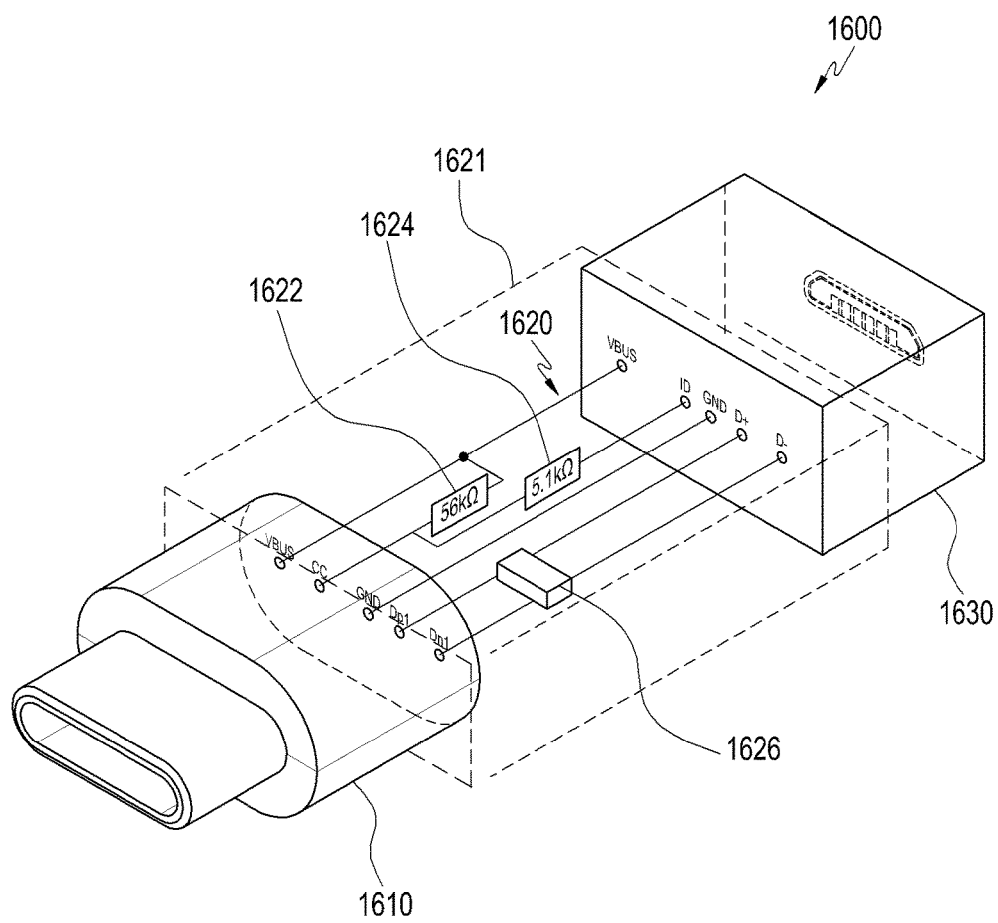
FIG. 16A is a diagram illustrating an example structure of an adapter according to a third example embodiment of the present disclosure.
Figure 16B:
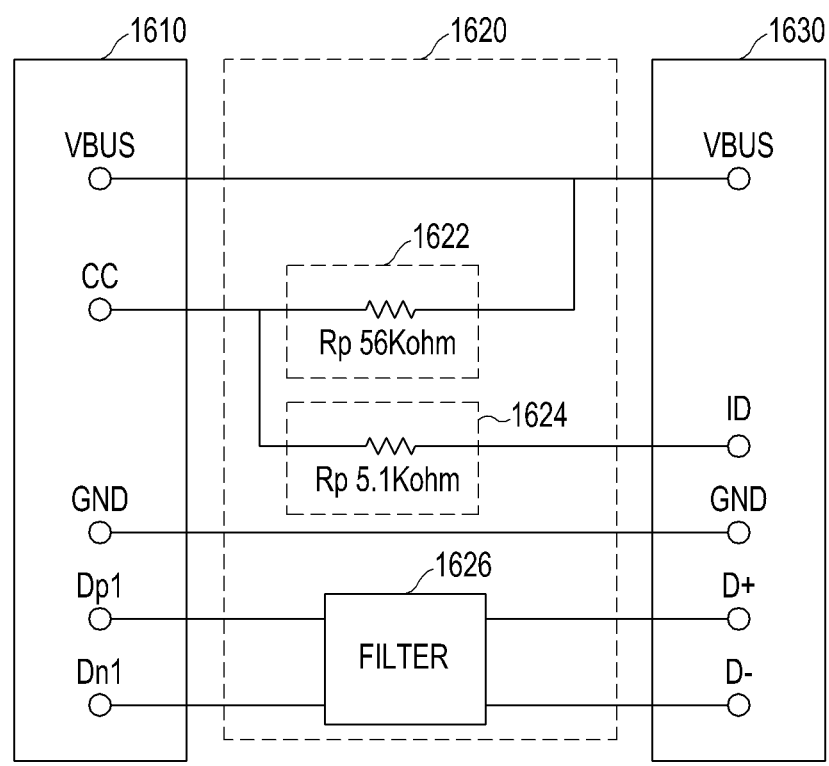
FIG. 16B is a diagram illustrating an example circuit configuration of an adapter according to the third example embodiment of the present disclosure.

FIG. 16A is a diagram illustrating an example structure of an adapter according to a third example embodiment of the present disclosure. FIG. 16B is a view illustrating an example circuit configuration of an adapter according to the third example embodiment of the present disclosure.

Referring to FIGS. 16A and 16B, an adapter 1600 may include a first USB-type first plug 1610, an electric circuit 1620, and a second USB-type second receptacle 1630. According to an embodiment of the present disclosure, the adapter 1600 may further include a housing 1621. The first USB-type first plug 1610 may be positioned at a first end of the housing 1621, and the second USB-type second receptacle 1630 may be positioned at a second end of the housing 1621 that faces the first end. The first USB-type first plug 1610 may be a USB type C plug and may include a VBUS terminal, a CC terminal, a Dp1 terminal, a Dn1 terminal, and a GND terminal According to an example embodiment of the present disclosure, the housing 1621 may be a cable that connects the first USB-type first plug 1610 and the second USB-type second receptacle 1630.

The second USB-type second receptacle 1630 may be a USB micro B receptacle and may include a VBUS terminal, an ID terminal, a D+ terminal, a D− terminal, and a GND terminal.

The electric circuit 1620 may include a first conducting line that electrically connects the VBUS terminals, a second conducting line that electrically connects the CC terminal with the VBUS terminal of the second USB-type second receptacle 1630, a third conducting line that electrically connects the Dp1 terminal and the D+ terminal, a fourth conducting line that electrically connects the Dn1 terminal and the D− terminal, a fifth conducting line that electrically connects the GND terminals, a first resistor 1622 connected to the second conducting line, a second resistor 1624 connected between the CC terminal and the ID terminal, and a filter 1626 connected between the fourth conducting line and the third conducting line.

According to an embodiment of the present disclosure, the first resistor 1622 may have a resistance that enables a determination as to whether power is supplied from an electronic device connected to the first USB-type first plug 1610 to the VBUS terminal of the second USB-type second receptacle 1630. According to an embodiment of the present disclosure, the first resistor 1622 may be 56 kohm.

According to an embodiment of the present disclosure, the second resistor 1624 may have a resistance that enables a determination as to whether an external device is connected to the ID terminal of the second USB-type second receptacle 1630 in an electronic device connected to the first USB-type first plug 1610. According to an embodiment of the present disclosure, the second resistor 1624 may be 5.1 kohm.

According to an embodiment of the present disclosure, the filter 1626 may be any one of a common mode filter, a circuit constituted of active elements, or a circuit constituted of passive elements. The filter 1626 may block the influx to the first electronic device and the second electronic device of noise signals, which are generated upon data communication between the first electronic device and the second electronic device using the Dp1 terminal and Dn1 terminal of the first USB-type first plug 1610 and the D+ terminal and D− terminal of the second USB-type second receptacle 1630. The filter 1626 may block interference signals from the first electronic device and the second electronic device from influencing data communication between the first electronic device and the second electronic device using the D+ terminal and the D− terminal.

Each of the aforementioned components of the electronic device may include one or more parts, and a name of the part may vary with a type of the electronic device. The electronic device in accordance with various example embodiments of the present disclosure may include at lest one of the aforementioned components, omit some of them, or include other additional component(s). Some of the components may be combined into an entity, but the entity may perform the same functions as the components may do.

The term 'module' may refer, for example, to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of a dedicated processor, a CPU, Application Specific Integrated Circuit (ASIC) chips, Field Programmable Gate Arrays (FPGAs), or Programmable Logic Arrays (PLAs) that perform some operations, which have already been known or will be developed in the future.

According to an example embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various example embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

It will be apparent to one of ordinary skill in the art that the various example embodiments of the present disclosure as described above are not limited to the above-described example embodiments and those illustrations in the drawings, and various changes, modifications, or alterations may be made thereto without departing from the scope of the present disclosure.

What is claimed is:

1. An electronic device, comprising:
   a first universal serial bus USB-type first plug including a first terminal, a second terminal, a third terminal, a fourth terminal, and a fifth terminal;
   a second USB-type second receptacle including a sixth terminal, a seventh terminal, an eighth terminal, a ninth terminal, and a tenth terminal;
   a first conducting line electrically connecting the first terminal and the sixth terminal;
   a second conducting line electrically connecting the second terminal and the sixth terminal;
   a third conducting line electrically connecting the third terminal and the eighth terminal;
   a fourth conducting line electrically connecting the fourth terminal and the ninth terminal;
   a fifth conducting line electrically connecting the fifth terminal and the tenth terminal;
   a first resistor connected to the second conducting line; and
   a second resistor connected between the second terminal and the seventh terminal to enable a first electronic device connected to the first plug to recognize a second electronic device connected to the second receptacle.

2. The electronic device of claim 1, further comprising a filter connected between the fourth conducting line and the fifth conducting line.

3. The electronic device of claim 1, wherein the first USB type is USB type C, and the second USB type is a USB micro B type.

4. The electronic device of claim 3, wherein the first terminal is a VBUS terminal, the second terminal is a CC terminal, the third terminal is a GND terminal, the fourth terminal is a Dp1 terminal, the fifth terminal is a Dn1 terminal, the sixth terminal is a VBUS terminal, the seventh terminal is an ID terminal, the eighth terminal is GND terminal, the ninth terminal is a D+ terminal, and the tenth terminal is a D− terminal.

5. The electronic device of claim 1, wherein the first resistor is 56 kohm, and the second resistor is 5.1 kohm.

6. The electronic device of claim 2, wherein the first resistor is 56 kohm, and the second resistor is 5.1 kohm.

7. The electronic device of claim 3, wherein the first resistor is 56 kohm, and the second resistor is 5.1 kohm.

8. The electronic device of claim 4, wherein the first resistor is 56 kohm, and the second resistor is 5.1 kohm.

9. An electronic device, comprising:
   a housing;
   a first USB-type first plug positioned at a first end of the housing and including a first terminal, a second terminal, a third terminal, a fourth terminal, and a fifth terminal;
   a second USB-type second receptacle positioned at a second end of the housing, facing the first end, and including a sixth terminal, a seventh terminal, an eighth terminal, a ninth terminal, and a tenth terminal;
   a first conducting line electrically connecting the first terminal and the sixth terminal;
   a second conducting line electrically connecting the second terminal and the sixth terminal;
   a third conducting line electrically connecting the third terminal and the eighth terminal;
   a fourth conducting line electrically connecting the fourth terminal and the ninth terminal;
   a fifth conducting line electrically connecting the fifth terminal and the tenth terminal;
   a first resistor connected to the second conducting line; and
   a second resistor connected between the second terminal and the seventh terminal to enable a first electronic device connected to the first plug to recognize a second electronic device connected to the second receptacle.

10. The electronic device of claim 9, further comprising a filter connected between the fourth conducting line and the fifth conducting line.

11. The electronic device of claim 9, wherein the first USB type is USB type C, and the second USB type is a USB micro B type.

12. The electronic device of claim 11, wherein the first terminal is a VBUS terminal, the second terminal is a CC terminal, the third terminal is a GND terminal, the fourth terminal is a Dp1 terminal, the fifth terminal is a Dn1 terminal, the sixth terminal is a VBUS terminal, the seventh terminal is an ID terminal, the eighth terminal is a GND terminal, the ninth terminal is a D+ terminal, and the tenth terminal is a D− terminal.

13. The electronic device of claim 9, wherein the first resistor is 56 kohm, and the second resistor is 5.1 kohm.

14. The electronic device of claim 10, wherein the first resistor is 56 kohm, and the second resistor is 5.1 kohm.

15. The electronic device of claim 11, wherein the first resistor is 56 kohm, and the second resistor is 5.1 kohm.

16. The electronic device of claim 12, wherein the first resistor is 56 kohm, and the second resistor is 5.1 kohm.

* * * * *